(12) United States Patent
Cau et al.

(10) Patent No.: US 9,250,930 B2
(45) Date of Patent: Feb. 2, 2016

(54) CONFIGURATION METHOD FOR AN ELECTRONIC ENTITY

(75) Inventors: Philippe Cau, Graz (AT); Mathieu Rimasson, Courbevoie (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 415 days.

(21) Appl. No.: 13/283,439

(22) Filed: Oct. 27, 2011

(65) Prior Publication Data

US 2012/0160922 A1    Jun. 28, 2012

(30) Foreign Application Priority Data

Oct. 27, 2010  (FR) ...................... 10 58833

(51) Int. Cl.
| | | |
|---|---|---|
| *G06K 19/00* | (2006.01) | |
| *G06F 9/445* | (2006.01) | |
| *G06Q 20/34* | (2012.01) | |
| *G07F 7/08* | (2006.01) | |

(52) U.S. Cl.
CPC .......... *G06F 9/44505* (2013.01); *G06Q 20/354* (2013.01); *G06Q 20/3552* (2013.01); *G07F 7/0826* (2013.01)

(58) Field of Classification Search
USPC .......................... 235/487, 488, 492, 375, 380
See application file for complete search history.

(56) References Cited

U.S. PATENT DOCUMENTS

| | | | |
|---|---|---|---|
| 7,589,652 B2 * | 9/2009 | Lee .......................... | H03M 1/66 341/141 |
| 7,673,201 B1 * | 3/2010 | Chan et al. ..................... | 714/725 |
| 2004/0041029 A1 * | 3/2004 | Postman ............... | G06F 1/1626 235/462.3 |
| 2006/0289659 A1 * | 12/2006 | Mizushima ........... | G06F 21/606 235/492 |

FOREIGN PATENT DOCUMENTS

WO    WO 99/40548    8/1999

* cited by examiner

*Primary Examiner* — Michael G Lee
*Assistant Examiner* — Tabitha Chedekel
(74) *Attorney, Agent, or Firm* — Cozen O'Connor (57) ABSTRACT

A method implemented by an electronic entity including a nonvolatile rewritable memory and a read-only memory, the method comprising: reception of at least one write command for writing to the nonvolatile memory, and en response to the command, writing configuration data to the nonvolatile memory, wherein the configuration data are obtained based on so-called prerecorded data read in the read-only memory.

23 Claims, 3 Drawing Sheets

CONFIGURATION METHOD FOR AN ELECTRONIC ENTITY

RELATED APPLICATIONS

This application claims the priority of French application no. 10/58833 filed Oct. 27, 2010, the entire content of which is hereby incorporated herein by reference.

BACKGROUND OF THE INVENTION

The present invention relates to the configuration of electronic entities such as microcircuit cards for example, also called "chip cards", and relates more particularly to the pre-issuance and/or issuance steps implemented following fabrication of a microcircuit card.

Such microcircuit cards are used in many fields of application (telecommunications, banking applications . . . ). They can in particular allow their bearers to gain access to their bank accounts, to carry out payment transactions or even to authenticate themselves using a card reader.

Figure 1:
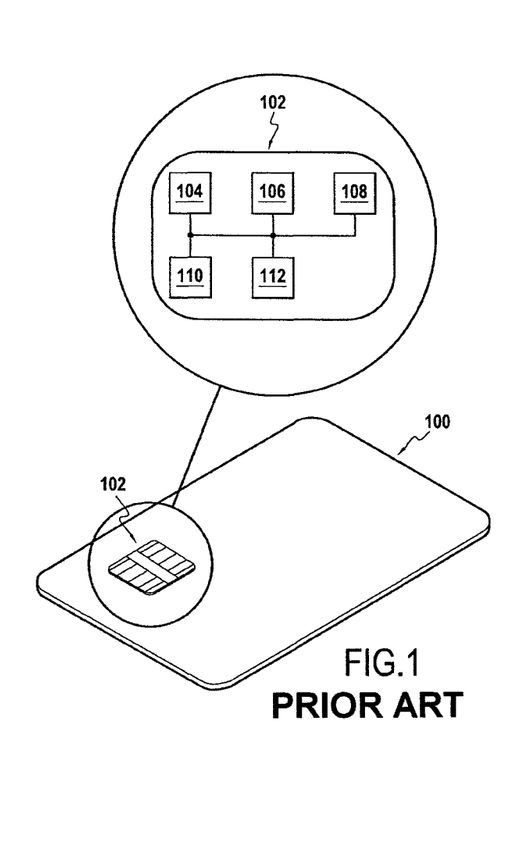
FIG. 1 shows schematically a conventional microcircuit card.

FIG. 1 shows schematically the hardware architecture of a conventional microcircuit card 100.

More particularly, the microcircuit card 100 includes a microcontroller 102 comprising a processor 104, a read-only memory (or ROM) 106, a nonvolatile rewritable memory 108, an input/output port 110 and a volatile rewritable memory (or RAM) 112. The different elements of the microcontroller are interconnected by a bidirectional bus.

In the example considered here, the nonvolatile rewritable memory 108 is an EEPROM type memory.

In the first place, it is worth recalling that data are generally placed in the read-only memory 106 by the integrated circuit manufacturer during the manufacture of the microcontroller 102. Typically, the manufacturer writes appropriate data directly into the patterns of the memory layers of the ROM 106. These data include, for example the operating system OS of the microcontroller, as well as a boot script.

Further, in known fashion, once the manufacture of the microcircuit card 100 is finished, it is necessary to configure the card, that is to store so-called configuration data in the EEPROM memory 108 of the microcontroller 102 in order to make the card operational. The storage of these configuration data in the EEPROM memory 108 is carried out in two successive steps called pre-issuance and issuance.

A pre-issuance step consists of configuring the microcontroller 102 of the card 100 by storing various pre-issuance data in the EEPROM memory 108. Typically, this pre-issuance step makes it possible in particular:

to select, among the applications stored in advance in the read-only memory 106, those which will be active on the card 100 once it is operational. For example, in the field of banking applications, it is possible to activate a banking application of the Visa or MasterCard type. In the field of personal identification, it is also possible to configure the EEPROM memory so as to activate a "passport" or "driver's license" application;

to configure the selected application(s) (to select for example the protocol to be used: BAC, EAC . . . );

to select the speed at which the microcontroller 102 communicates with a compatible reader;

to select the operating speed of the processor 104;

to select the size limit of the EEPROM memory 108.

After the pre-issuance step, a step consisting of customizing, the card 100 is generally carried out. During this step, issuance data are stored in the EEPROM memory 108 of the microcontroller 102. issuance data consist of personal data of the final bearer of the card 100. They include for example at least one of the following data:

family name;
given name;
date of birth;
photo of the bearer,
card number,
cryptographic key of the card . . . .

Most often, the issuance step includes in addition the creation of a file tree in the EEPROM memory 108.

Writing the pre-issuance, then the issuance data to the EEPROM memory 108 is accomplished by means of a microcircuit card reader. Typically, this card reader sends a succession of write commands to the microcontroller 102 during the pre-issuance and issuance steps. These commands contain data which the microcontroller 102 must write into the EEPROM memory 108.

Generally, these write commands are of the APDU (Application Protocol Data Unit) type complying with ISO standard 7816-4.

One of the principal APDU commands used during a pre-issuance step is the PUT DATA command.

Moreover, the principal APDU commands used during issuance are: CREATE FILE and UPDATE BINARY.

In a PUT DATA or UPDATE BINARY command, the data to be written are contained in the data field "Command Data Field" of the command. Likewise, in a CREATE FILE command, the file name (EFID per ISO 7816), the file size and the conditions for gaining access to the file in question are contained in the data field "Command Data Field" of the command.

Thus, the microcontroller 102 generally receives tens of APDU commands during the pre-issuance and issuance steps, each of these write commands requiring the writing of particular data (of a byte for example) to the EEPROM memory 108.

In general, the executable program of the read-only memory 106 implemented by the microcontroller 102 when an APDU command is received appears as follows:

S100: Checking whether authentication of the card reader by the card 100 has been successfully accomplished (implementation of the GET CHALLENGE and/or MUTUAL AUTH commands, for example . . . );

S110: Checking the authorization associated with the received APDU command, for example:

S111. Checking that the current state of the card 100 allows the implementation of the received APDU command (the PUT DATA, CREATE FILE and UPDATE BINARY commands are generally only authorized in the card pre-issuance and/or issuance phases).

S112. Checking that, according to the authorization accomplished in step 100, the received APDU command can in fact be executed by the card.

S120: Actual call of the APDU function received. This step can include in particular:

S121. Checking the integrity of the received APDU command. Typically, a signature of the APDU command is checked (MAC type signature, for example).

In general, to limit the execution time of this step, an identical session key is used for several APDU commands.

S122. Decrypting the configuration data to be written (to guarantee the confidentiality of the operation).

S123. Copying the data to be written into a memory buffer of the RAM memory 112 dedicated to writing to the EEPROM memory 108.

S124. Call to the driver of the EEPROM memory 108 to write the content of said memory buffer into the EEPROM memory 108.

It should also be noted that, for each APDU command received, the microcontroller 102 must perform protocol processing (also called "protocol overhead"). This protocol processing includes, for example the checking by the microcontroller 102 of the CRC of a received APDU command.

Moreover, it is possible in some cases to proceed with a reconfiguration of the microcircuit card 100 after the issuance step, that is once the card is operational. Such a configuration corresponds to a post-issuance step, that is a configuration step subsequent to the issuance phase.

A post-issuance step makes it possible to modify the configuration of a microcircuit card in order, for example, to change the personal data or the directory and file tree in the card.

The Applicant, however, has observed that the configuration of a microcircuit card during the pre-issuance, issuance and post-issuance steps exhibits a major drawback in that it necessitates a particularly long execution time.

Indeed, as indicated above, for each APDU command received, the microcontroller 102 must perform a number of processing operations (authentication of the sender, encryption of the data to be written, verification of the integrity of the commands received, call to the write driver of the EEPROM memory 108 . . . ). Each of these operations requires a non-negligible execution time. Given the large number of APDU commands generally received by the microcontroller 102 during the pre-issuance and issuance steps, it is understandable that the configuration of the card 100 can be particularly costly in terms of time.

In practice, the manufacture of microcircuit cards is in fact subject to very strict time constraints during the micro card fabrication and configuration phases. Hence the greater the execution time required by the pre-issuance and issuance steps, the greater the cost of the microcircuit cards.

The Applicant has of course noted that it would be possible to increase the quantity of data contained in each APDU command sent to a card to be configured. However, increasing the data in the APDU command data field would considerably slow the processing to be carried out by the microcircuit card.

SUMMARY OF THE INVENTION

One object of the invention is to minimize the time necessary for configuring an electronic entity such as a microcircuit card for example. There exists more particularly a need to reduce the execution time:
- of the pre-issuance and issuance steps carried out by the manufacturers on the microcircuit cards in order to make them operational,
- of the post-issuance steps that can be carried out on a microcircuit card once it is already operational.

To this end, one aspect of the present invention relates to a configuration method implemented by an electronic entity including a nonvolatile rewritable memory and a read-only memory, the method comprising:
  receiving at least one write command for writing to the nonvolatile memory, and
  in response to said command, writing the configuration data to the nonvolatile memory, wherein the configuration data are obtained from so-called prerecorded data read from the read-only memory.

The present invention is advantageous in that it allows a considerable reduction in the number of write commands to be sent to an electronic entity (such as a microcircuit card for example) for configuring it, for example during a pre-issuance step, an issuance and/or a post-issuance step.

Consequently, the necessary execution time for configuring an electronic entity such as a microcircuit card, for example during a pre-issuance and/or issuance step, is significantly reduced. Indeed, in the case of a microcircuit card for example, the invention makes it possible, at the card level, to dispense with a large number of processing operations inherent in each write command received. The reduction in the number of commands sent to the card to be configured makes it possible in particular to limit the number of protocol processing operations, of integrity and/or command signature checks and of data decryption operations.

In addition, thanks to the invention it is possible to significantly reduce the processing time of each write command received by an electronic entity (such as a microcircuit card) during a configuration step.

The invention can thus make it possible to advantageously reduce the production cost of microcircuit cards.

The configuration method of the invention can also comprise a step of identification of the prerecorded data based on the command received. This embodiment advantageously allows the electronic entity to select, among all those prerecorded in the read-only memory, the data to be taken into account to obtain the configuration data.

In one particular embodiment, the configuration data are the prerecorded data. In other words, it is the prerecorded data that the electronic entity writes as configuration data to the read-only memory.

According to one alternative, the electronic entity performs at least one treatment of the prerecorded data in order to obtain the configuration data. In this case, the configuration data are obtained indirectly based on the prerecorded data.

Further, the command can include at least one identifier of the prerecorded data. In this manner, the electronic entity is able to retrieve, based on this identifier, the prerecorded data.

In a particular embodiment, this identifier identifies a register in the read-only memory allowing identification of an area holding the prerecorded data. The electronic entity can thus determine, based on this identifier, the memory area containing the prerecorded data.

Moreover, the command is preferably an APDU command complying with the ISO 7816 standard.

Furthermore, the electronic entity can, for example, correspond to one of the following entities:
  a microcircuit card,
  a USB flash drive, or
  an electronic passport.

In one particular embodiment, a single write command is received during the reception step, the configuration data being pre-issuance and issuance data. In this manner, it is possible to pre-issue and to issue, based on a single write command of the invention, an electronic entity such as a microcircuit card for example.

In one particular embodiment, the different steps in the configuration method of the invention are determined by computer program instructions.

Consequently, the invention also applies to a computer program on an information medium, this program being capable of implementation within an electronic entity such as a microcircuit card, or more generally in a computer, this program comprising instructions suited to the implementation of the steps of a configuration method as mentioned above.

The invention also applies to a computer-readable recording medium (or information medium) including the instructions of a computer program as mentioned above.

Correspondingly, the invention relates to an issuance, pre-issuance or post-issuance method implemented by a device including means of communicating with an electronic entity, the method comprising the sending of a command for configuring the electronic entity according to a configuration method such as that mentioned above.

In one particular embodiment, the different steps of the issuance, pre-issuance or post-issuance method are determined by computer program instructions.

Consequently, the invention also relates to a computer program an information medium, this program being capable of implementation in a device such as a microcircuit card reader, or more generally in a computer, this program comprising instructions suited to implementing the steps of a pre-issuance or issuance method such as that described above.

The invention also applies to a computer-readable recording medium (or information medium) containing the instructions of a computer program such as that mentioned above.

It should be noted that the programs mentioned before can use any programming language and be in the form of source code, object code, or a code intermediate between source code and object code, such as in partially compiled form, or in any other desirable form.

In addition, the recording media mentioned before can be any entity of device capable of storing the program. For example, the medium can comprise a storage medium like a ROM, for example a CD-ROM or a microelectronic circuit ROM, or even a magnetic recording means, for example a diskette (floppy disk) or a hard disk.

Moreover, the recording media can correspond to a transmittable medium such as an electrical or optical signal, which can be routed via an electrical or optical cable, by radio or by other means. The program according to the invention can in particular be uploaded to a network of the Internet type.

Alternatively, the recording media can correspond to an integrated circuit wherein the program is incorporated, the circuit being designed to execute or to be used in the execution of the method in question.

The invention also relates to an electronic entity including a nonvolatile rewritable memory, a read-only memory, means for receiving at least one write command for writing to the nonvolatile memory and processing means for writing configuration data, in response to the command, to the nonvolatile memory. In this card:

the processing means are operable to obtain configuration data based on so-called prerecorded data read in the read-only memory.

The advantages and comments expressed with reference to the different embodiments of the configuration method of the invention apply in similar fashion to the different embodiments of the electronic entity of the invention.

In one particular embodiment, the processing means are operable to identify the prerecorded data based on the command received.

Further, the configuration data can be the prerecorded data.

According to another embodiment, the processing means are operable to extract from the command received at least one identifier of the prerecorded data.

Furthermore, the electronic entity can for example correspond to one of the following entities:
a microcircuit card,
a USB flash drive, or
an electronic passport.

Correspondingly, the invention relates to a device including means for sending a write command to an electronic entity, the reception of the command by the electronic entity triggering a configuration process such as that mentioned before.

DETAILED DESCRIPTION OF THE DRAWINGS

One aspect of the present invention relates to the configuration of an electronic entity, and relates more particularly to pre-issuance and/or issuance steps performed by a manufacturer on a microcircuit card after its fabrication, as well as to the post-issuance steps accomplished subsequently when the microcircuit card is operational.

It should be noted that, in this document, the terms "pre-issuance data" and "issuance data" will be used to designate configuration data to be written to the nonvolatile rewritable memory of a microcircuit card during the pre-issuance and issuance steps, respectively.

In this document, examples of implementation of the invention are described within the scope of the pre-issuance and the issuance of a microcircuit card.

As indicated subsequently in greater detail, it will be understood however that the invention does not apply exclusively to a pre-issuance step and/or an issuance step, but can be implemented within the scope of any configuration. Likewise, the invention does not apply exclusively to microcircuit cards but relates more generally to any type of electronic entity.

Still with reference to FIG. 1, the Applicant has observed that, particularly within the scope of cards having a native single-application microcircuit, the configuration data to be written into the EEPROM memory 108 vary very little from one card to another.

More precisely, the Applicant has noted that the pre-issuance data vary very little depending on the customers, batches and products considered.

Likewise, the Applicant has noted that certain issuance data change very little from one card to another. In particular, the issuance data relating to the file structure to be stored in the EEPROM memory 108 generally vary very little when the cards include standardized file systems. Indeed, the file names and directory names are generally imposed by the standard adopted by the card manufacturer. This is particularly the case when the microcircuit cards are compliant with the EMV or Europay MasterCard Visa standard (in the field of banking cards) or the LDS or Logical Data Structure standard (in the field of personal identification).

Thus, the Applicant has developed a method for configuring a microcircuit card allowing pre-issuance and/or issuance of a microcircuit based on so-called prerecorded data, that is data incorporated in advance into the read-only memory of the card. As indicated subsequently in greater detail, the configuration method of the invention advantageously allows a reduction in the number of write commands sent to the microcircuit card during its configuration by the card manufacturer.

Figure 2:
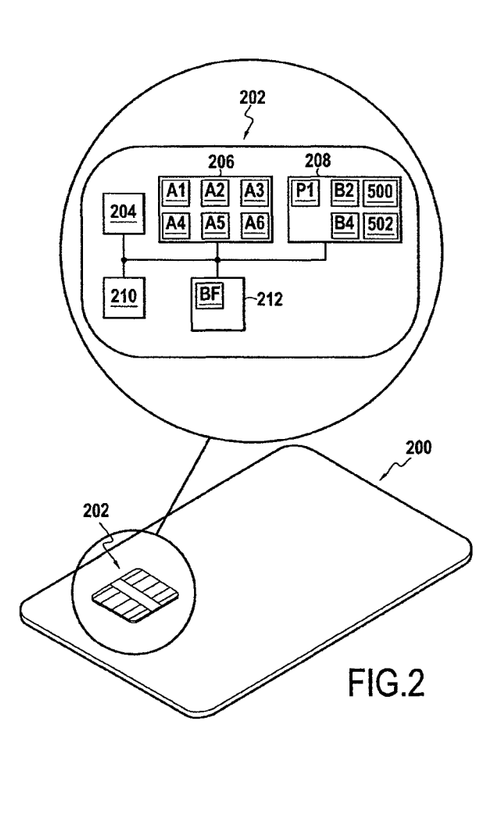
FIG. 2 shows schematically the hardware architecture of a microcircuit card in conformity with a particular embodiment of the invention.

FIG. 2 shows schematically the hardware architecture of a microcircuit card 200 conforming to a particular embodiment of the invention. The card 200 in this example complies with the ISO 7816 standard.

More particularly, the microcircuit card 200 includes a microcontroller 202 comprising a processor 204, a ROM or read-only memory 206, a nonvolatile rewritable memory 208, an input/output port 210 and a volatile rewritable memory (RAM type) 212.

In the example contemplated here, the nonvolatile rewritable memory 208 is an EEPROM type memory. It will however be understood that other types of nonvolatile rewritable memory can be contemplated by a person skilled in the art, such as Flash NAND type memory for example.

Figure 6:
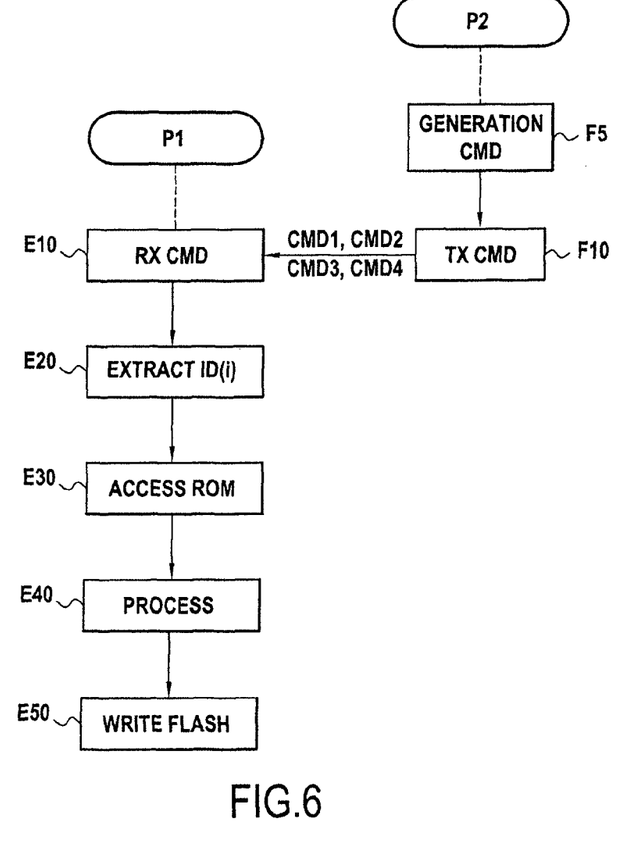
FIG. 6 shows, in the form of a flowchart, the principal steps in a configuration method and the principal steps in an issuance or pre-issuance method conforming to a particular embodiment of the invention.

This EEPROM memory 208 constitutes an information medium in conformity with the invention. It holds a computer program P1 conforming to one particular embodiment of the invention the principal steps whereof, E10 through E50, are shown in FIG. 6.

Figure 4:
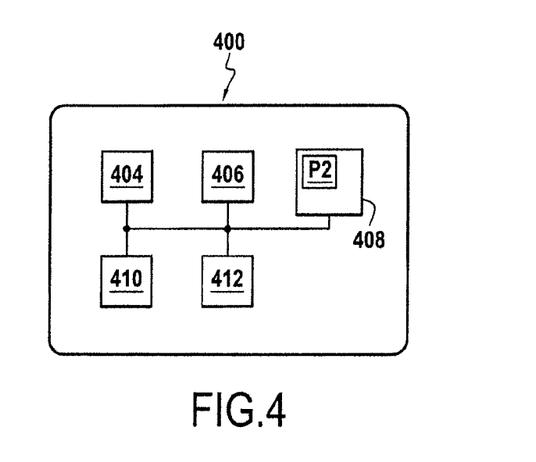
FIG. 4 shows schematically the hardware architecture of a card reader conforming to one particular embodiment of the invention.

FIG. 4 shows schematically the hardware architecture of a card reader 400 according to one particular embodiment of the invention. This card reader 400 is in particular capable of configuring the microcontroller 202 of the card 200.

More particularly, the card reader 400 comprises a processor 404, a read-only memory (ROM type) 406, a nonvolatile rewritable memory 408, an input/output port 410 and a volatile rewritable memory (RAM type) 412.

The microcircuit card 200 and the card reader 400 are capable of communicating with one another using the input/output ports 210 and 410 respectively.

In the example considered here, the nonvolatile rewritable memory 408 is an EEPROM type memory. It will however be understood that other types of nonvolatile rewritable memory can be contemplated by a person skilled in the art.

This EEPROM memory 408 constitutes an information medium conforming to the invention. It holds a computer program P2 conforming to one particular embodiment of the invention, the principal steps whereof, F5 and F10, are shown in FIG. 6.

A first embodiment of the invention is described at present with reference to FIGS. 2 through 6. More precisely, the card 200 implements the configuration method by executing the program P1. Likewise, the reader 400 implements the issuance or pre-issuance method by executing the program P2.

In this first implementation example, the read-only memory 206 of the card 200 holds three packets of so-called prerecorded data denoted respectively A1, A2 and A3.

It will naturally be understood that the invention is not limited exclusively to the case where three packets of prerecorded data are stored in the read-only memory 206, but rather applies to an arbitrary number N of packets of prerecorded data, N being an integer greater than or equal to 1.

In this example, the case considered is that where the prerecorded data A1, A2 and A3 stored in the read-only memory 206 are to be used for the pre-issuance of the card 200. These packets A1, A2 and A3 have for example a size of 128 bytes each.

Figure 3:
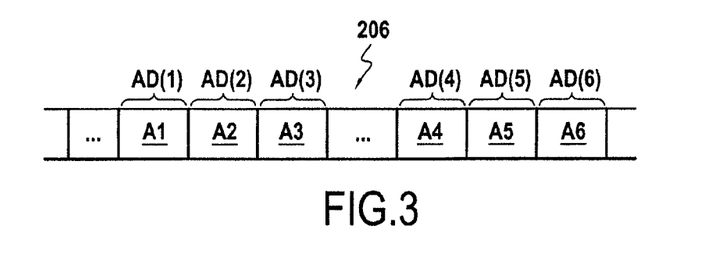
FIG. 3 shows schematically prerecorded data conforming to the invention which are stored in registers in the read-only memory of the card 200 illustrated in FIG. 2.

FIG. 3 shows schematically the prerecorded data A1, A2 and A3 contained in the read-only memory 206 of the microcontroller 202. Each of the packets A1, A2 and A3 of prerecorded data is contained in a specific area of the read-only memory 206, each of these areas comprising at least one register. In the example considered here, the data A1, A2 and A3 are respectively recorded at addresses AD(1), AD(2) and AD(3) of the read-only memory 206. Each of the addresses AD(1) through AD(3) can, for example, correspond to the addresses of the first register of the areas in which the data A1, A2 and A3 are respectively stored.

It is now assumed that a card manufacturer is proceeding with the pre-issuance of the card 200 using the card reader 400.

To accomplish this, the card reader 400 generates a write command CMD1 (step F5). In the example described here, the command CMD1 is a proprietary APDU command. It will however be understood that other types of command can be contemplated by a person skilled in the art.

The purpose of the command CMD1 is to instruct the card 200, and more particularly the microcontroller 202, to perform a pre-issuance based on prerecorded data present in the read-only memory 206.

Here the case is contemplated where the card reader 400 is configured to instruct the card 200 to carry out a pre-issuance step on the basis of the prerecorded data A2 contained in the read-only memory 206. That is why the reader inserts an identifier ID(2) into the command CMD1 to be sent to the microcontroller 202 (step F5). This identifier ID(2) indentifies the packet of prerecorded data A2 contained in the read-only memory 206 of the card 200.

Further, it will be assumed in what follows that the identifiers ID(1) and ID(3) correspond respectively to the packets of prerecorded data A1 and A3.

Once it is generated, the card reader 400 sends the command CMD1 to the microcontroller 202 during a sending step F10. This sending is carried out in this example using the input/output port 410.

When the microcontroller 202 receives the command CMD1 via its input/output port 210 (step E10), it first of all carries out conventional processing operations, such as for example:
  checking (S110) authorizations for carrying out the command CMD1,
  checking (S121) the integrity of CMD1, and
  decryption of the data of the command CMD1 (similar to S122).

The microcontroller 202 then extracts, during a processing step E20, the identifier ID(2) contained in the received command CMD1.

Based on the identifier ID(2) extracted from the received command CMD1, the microcontroller 202 is able to identify the prerecorded data A2 as those to be taken into account for carrying out the pre-issuance step (step E20).

Figure 5:
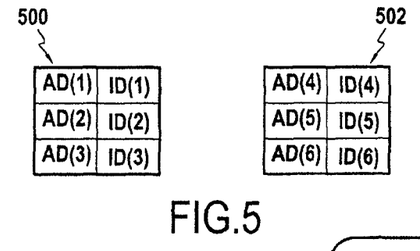
FIG. 5 shows an example of a correlation table recorded in the internal memory of the card reader of FIG. 4 in conformity with one particular embodiment of the invention.

In the example considered here, it is assumed that the EEPROM memory 208 of the card 200 contains the table 500 illustrated in FIG. 5. The table 500 is a correlation table containing, for each identifier ID(1), ID(2) and ID(3) that might be present in the received command CMD1, the corresponding address, denoted AD(1), AD(2) and AD(3) respectively.

In this example, the identifiers ID(1) through ID(3) have an arbitrary format and allow the microcontroller 204 to identify an associated area or a register in the read-only memory 206.

It should be noted, however, that the table 500 contained in the EEPROM memory 208 is optional. Indeed, other embodiments can be contemplated wherein the table 500 is not necessary for the microcontroller 202 to identify the packet(s) of prerecorded data to be taken into account for performing the pre-issuance step.

Thus, alternatively, the EEPROM memory 208 is not required to contain a table 500. In this case, the identifiers ID(1), ID(2) and ID(3) that may be present in the command CMD1 are (or include) the addresses AD(1), AD(2) and AD(3), respectively. In this manner, the microcontroller 202 is capable, based on the identifier ID(2) extracted from the command CMD1, of identifying the memory area of the read-only memory 206 wherein are located the prerecorded data A2 to be taken into account, and this without invoking a correlation table such as the table 500.

Then, in response to the received command CMD1, the microcontroller 202 proceeds with an access step E30 during which it retrieves the prerecorded data A2 present in the read-only memory 206.

The microcontroller 202 then copies the prerecorded data A2 into a dedicated memory buffer (denoted BF) of the RAM memory 212. It should be noted that this operation requires a call to the driver program of the EEPROM memory 208 each time that the memory buffer BF is filled. Once filled, the memory BF is reinitialized. The memory BF comprises, for example, 64 bytes.

In this example, the microcontroller 202 also proceeds with a step E40 consisting of processing of the retrieved data A2. Here "processing" of the data means at least one operation allowing transformation of the data under consideration.

It should be noted for example that the data A2 can be stored in encrypted form in the read-only memory 206, so that decryption is necessary before proceeding with writing to the EEPROM memory 208. The processing step E40 can also make it possible to modify the format of the data A2 or include any other processing operations for the purpose of preparing for the forthcoming step of writing to the EEPROM memory 208.

More generally, the processing step makes it possible, based on the prerecorded data A2, to obtain the corresponding configuration data B2.

Once the processing step E40 is finished, the microcontroller 202 writes the configuration data B2 to the EEPROM memory (writing step E50).

Thus the method of the invention makes it possible to write pre-issuance data to the EEPROM memory 208 of the card 200 based on prerecorded data read in the read-only memory 206.

It should be noted that the processing step E40 is optional. Indeed, following the access step E30, the microcontroller 202 can simply copy the prerecorded data A2 to the memory buffer BF in order to write these data directly to the EEPROM memory 208. In this particular case, the configuration data B2 to be written to EEPROM memory 208 are the prerecorded data A2 retrieved from the read-only memory 206.

Further, the command CMD1 can for example instruct the microcontroller 202 to take into account, during a pre-issuance step, data prerecorded in the read-only memory 206 of the same nature as those contained in the conventional PUT DATA commands. These prerecorded data to be taken into account are, for example, in conformity with at least one of the following data types:
 configuration data for the card's microcontroller (operating speed of the microcontroller, . . . ),
 configuration data of the card's communication protocol (card communication speed, . . . ),
 configuration data of the card's nonvolatile rewritable memory (definition of the size limit of the EEPROM memory 208, . . . ).

In addition, the write command CMD1 can include a plurality of identifiers ID in order to instruct the card 200 to take into account a plurality of packets of prerecorded data contained in the read-only memory 206 for carrying out a pre-issuance operation. Thus, the command CMD1 can for example include the identifiers ID(1), ID(2) and/or ID(3) so that the card can proceed with a pre-issuance operation on the basis of the data A1, A2 and/or A3.

It is now assumed that the read-only memory 206 also includes packets of prerecorded data denoted A4, A5 and A6 to be used for the issuance of the card 200. In this example, each of these packets includes at least one preconfigured file and/or directory tree.

FIG. 3 also shows schematically the data packets A4, A5 and A6 contained in the read-only memory 206 of the microcontroller 202. Each of the packets A4, A5 and A6 is contained in a specific area of the read-only memory 206, each of these areas including at least one register. In the example considered here, the prerecorded data A4, A5 and A6 are respectively recorded at the addresses AD(4), AD(5) and AD(6) of the read-only memory 206. Each of the addresses AD(4) through AD(6) can, for example, correspond to the address of the first register of the areas is which are stored the data A4, A5 and A6, respectively.

It is now assumed that a card manufacturer is proceeding with the issuance of the card 200 by means of the card reader 400. This issuance of the card 200 is carried out in a manner analogous to the pre-issuance example described before.

More particularly, the card reader 400 generates (step F5) a write command CMD2. In the example described here, the command CMD2 is a proprietary APDU command. As for the command CMD1, however, other types of command can be contemplated for the command CMD2.

The purpose of the command CMD2 is to instruct the card 200, and more particularly the microcontroller 202, to carry out an issuance on the basis of prerecorded data present in the read-only memory 206.

The case is now considered where the card reader 400 is configured to instruct the card 200 to carry out an issuance step on the basis of prerecorded data A4 contained in the read-only memory 206. That is why the reader 400 inserts an identifier ID(4) into the command CMD2 to be sent to the microcontroller 202 (step F5). This identifier ID(4) identifies the packet of prerecorded data A4 contained in the read-only memory 206 of the card 200.

Moreover, it will be assumed in what follows that the identifiers ID(5) and ID(6) correspond respectively to the packets of prerecorded data A5 and A6.

Once it is generated, the card reader 400 sends, by means of the input/output port 410, the command CMD2 to the microcontroller 202 (sending step F10).

When the microcontroller 202 receives the command CMD2 via its input/output port 210 (step E10), it first of all carries out conventional processing operations, such as for example:
 checking the authorizations for carrying out the command CMD2,
 checking the integrity of the command CMD2, and
 decrypting the data of command CMD2.

The microcontroller 202 then extracts, during a processing step E20, the identifier ID(4) contained in the received command CMD2.

Based on the identifier ID(4) extracted from the received command CMD2, the microcontroller 202 is capable of identifying the prerecorded data A4 as those to be taken into account for carrying out the issuance step (step E20).

In the example considered here, it is assumed that the EEPROM memory 208 of the card 209 contains the table 502 illustrated in FIG. 5. The table 502 is a correlation table containing, for each identifier ID(4), ID(5) and ID(6) that might be present in the received command CMD2, the corresponding address denoted AD(4), AD(5) and AD(6) respectively.

In this example, the identifiers ID(4) through ID(6) have an arbitrary format and allow the microcontroller 204 to identify an associated area or register in the read-only memory 206.

It should be noted, however, that the correlation table 502 contained in the EEPROM memory 208 is optional. Indeed, other embodiments can be contemplated wherein the table 502 is not necessary for the microcontroller 202 to identify the packet(s) of prerecorded data to be taken into account for carrying out the issuance step.

Thus, alternatively, the EEPROM memory 208 is not required to contain a table 502. In this case, the identifiers ID(4), ID(5) and ID(6) which might be included in the command CMD2 can be (or include) the addresses AD(4), AD(5) and AD(6), respectively. In this manner, the microcontroller 202 is capable, based on the identifier ID(4) extracted from the command CMD2, of identifying the memory area of the read-only memory 206 wherein are located the prerecorded data A2 to be taken into account, and this without invoking a correlation table such as the table 502.

Then, in response to the received command CMD2, the microcontroller 202 proceeds with an access step E30 during which it retrieves the prerecorded data A4 present in the read-only memory 206.

The microcontroller 202 then copies the prerecorded data A4 to a dedicated memory buffer (denoted BF) of the RAM memory 212. As indicated previously, this operation necessitates a call to the driver of the EEPROM memory 208 each time the memory buffer BF is filled.

In this example, the microcontroller 202 also carries out a step E40 consisting of processing the retrieved data A4. As already indicated before, the prerecorded data A4 can be encrypted, and can therefore require decryption before proceeding with writing to the EEPROM memory 208. The processing step E40 can also allow modification of the format of the data A4 or include any other processing operations for the purpose of preparing for the forthcoming step of writing to the EEPROM memory 208.

More generally, the processing step E40 makes it possible in this case to obtain, based on the prerecorded data A4, the corresponding configuration data B4.

Once the processing step E40 is finished, the microcontroller 202 writes the configuration data B4 to the EEPROM memory 208 (writing step E50).

It should be noted that, as in the pre-issuance phase, the processing step E40 is optional here. Indeed, following the access step E30, the microcontroller 202 can simply copy the prerecorded data A4 to the memory buffer BF in order to directly write these data to the EEPROM memory 208. In this particular case, the configuration data B4 to be written to the EEPROM memory 208 are the prerecorded data A4 retrieved from the read-only memory 206.

The method of the invention thus makes it possible to write issuance data in the EEPROM memory 208 of the card 200 based on prerecorded data read in the read-only memory 206.

In a manner analogous to CMD1, the write command CMD2 can include more than one identifier ID in order to instruct the card 200 to take into account a plurality of data packets prerecorded in the read-only memory 206 for carrying out an issuance step. Thus, the command CMD2 can for example include the identifiers ID(4), ID(5) and/or ID(6) so that the card 200 proceeds with issuance on the basis of the data A4, A5 and/or A6.

Further, the command CMD2 can, for example, instruct the microcontroller 202 to take into account, during an issuance step, data prerecorded in the read-only memory 206 of the same nature as those contained in the conventional commands of the CREATE FILE or UPDATE BINARY type. These prerecorded data to be taken into account are, for example, personal data as described previously, or data relating to a file and/or directory tree.

Further, the packets of prerecorded data A4, A5 and A6 contained in the read-only memory 206 of the card 200 can each include at least one script (or executable program). These scripts include in particular one or more conventional internal write command data fields, of the APDU type for example.

In this case, when the microcontroller 202 receives in step E10 the command CMD2, it first of all carries out conventional processing operations such as for example:

checking authorizations for carrying out the command CMD2,
checking the integrity of the command CMD2, and
decrypting the data of the command CMD2.

The microcontroller 202 then extracts in step E20 the identifier(s) ID(i) included in the received command CMD2. In this example, it will be assumed that the identifier ID(4) is extracted from the command CMD2 during step E20. Based on the identifier ID(4), the microcontroller 202 determines that the packet of prerecorded data A4 must be taken into account for proceeding with the issuance step. The microcontroller 202 then executes the script (denoted script4) contained in the packet A4. This script allows for example the execution of two bodies of APDU commands (of the CREATE FILE and UPDATE BINARY type for example) contained in the data packet A4.

By way of example, script4 can appear as follows:

checking the integrity of the prerecorded command A4 (this step possibly comprising the verification of a signature, of the MAC type for example),
decryption of the prerecorded configuration data A4,
copying the decrypted data A4 to the memory buffer BF
call to the driver of the EEPROM memory 208 to write the content of the memory buffer BF to the EEPROM memory 208,
other processing . . . .

Each script allows the microcontroller 202 to carry out steps E30 through E50 in conjunction with the corresponding packet of prerecorded data. In this example, script4 allows steps E30 through E50 to be carried out in conjunction with the packet A4 contained in the read-only memory 206.

This embodiment is advantageous in that the packet A4 includes in the read-only memory 206 all the parameters necessary for the execution of script4. These parameters are simply identified using the identifier ID(4) extracted from the received command CMD2.

It is also worth noting that it is not compulsory for the card reader 400 to insert an identifier ID(i) into the write command CMD1 or CMD2 during the generation step F5 (i being an integer comprised between 1 and 6 in this example).

Thus, according to a second embodiment, the card reader 400 contains no identifier ID(i). In this case, the write commands generated by the reader 400 during step F5 do not contain any identifier allowing the microcontroller 202 to identify the prerecorded data to be taken into account for configuring itself.

For example, the case is considered where a single packet (denoted A1) of prerecorded pre-issuance data and a single packet (denoted A4) of prerecorded issuance data are stored in the read-only memory 206 of the microcontroller 202.

In this case, the write command denoted CMD3 sent by the card reader 400 during the step F10 contains no corresponding identifier ID(1) or ID(4). This command CMD3 (a proprietary APDU type command for example) sent by the reader 400 simply indicates to the microcontroller that it must configure itself based on prerecorded data present in its read-only memory (i.e. the read-only memory 206).

More precisely, the command CMD3 received in step E10 indicates, for example, to the microcontroller 202 that it must carry out pre-issuance based on prerecorded data (not identified in the command CMD3) contained in the read-only memory 206. In this case, A1 is the only packet of prerecorded data contained in the read-only memory 206 which is designed for pre-issuance of the card 200. Consequently, the microcontroller deduces from the received command CMD3 that it must carry out a pre-issuance based on the prerecorded data A1. Here, no step E20 consisting of extracting an identifier is carried out: the microcontroller goes directly from step E10 to step E30. During this step E30, the microcontroller 202 reads in the read-only memory 206 the prerecorded data A1, then proceeds to steps E40 and E50 as in the first embodiment described previously. As indicated previously, step E40 is optional.

In a similar manner, the command CMD3 can indicate to the microcontroller 202 that it must carry out an issuance based on prerecorded data (not identified in the command CMD) contained in the read-only memory 206. In this case, A4 is the only prerecorded data packet contained in the read-only memory 206 which is designed for issuance of the card 200. Consequently, the microcontroller 202 deduces from the received command CMD3 that it must carry out an issuance based on the prerecorded data A4. Just as above, here no step E20 consisting of extracting an identifier is carried out: the microcontroller goes directly from step E10 to step E30. During this step E30, the microcontroller 202 reads in the read-only memory 206 the prerecorded data A4, then proceeds to steps E40 and E50 as in the first embodiment described previously. As indicated previously, step E40 is optional.

Moreover, the implementation examples described before are carried out within the scope of a microcircuit card pre-issuance or issuance. It will however be noted that the present invention can also be applied within the scope of any configuration phase, such as a microcircuit card post-issuance phase for example.

By way of example, the invention can apply to a SIM card arranged within a mobile telephone (or any other mobile communication equipment), this SIM card including a read-only memory and a nonvolatile rewritable memory. It is thus possible to receive in the form of a message (of the SMS type for example) at least one command conforming to the invention. The SIM card is then configured to write in its nonvolatile rewritable memory, in response to this command, configuration data obtained from prerecorded data read in its read-only memory.

This variant thus makes it possible to remotely configure a microcircuit card during its life phase, that is in its functional phase subsequent to the issuance phase.

Moreover, the case can be contemplated where the microcontroller 202 proceeds with a pre-issuance and with an issuance in response to a single write command received during step E10.

Thus, in an alternative to the first embodiment, the card reader 400 generates a command CMD4 during step F5, this command including for example the identifiers ID(2) and ID(4). As indicated previously, the identifiers ID(2) and ID(4) correspond here to the prerecorded data packets A2 and A4 designed respectively for the pre-issuance and the issuance of the microcontroller 202.

Once the identifiers ID(2) and ID(4) are extracted from the command CMD4 during step E20, the microcontroller 202 proceeds with a pre-issuance, then with an issuance. For example, after step E30, the microcontroller reads the prerecorded data A2 in the read-only memory 206 (step E30) and writes the data B2 (obtained based on the data A2) to the EEPROM memory 208 (step E50). Thereafter, the microcontroller performs steps E30 through E50 again to proceed with issuance. To this end, this time the microcontroller 202 reads the prerecorded data A4 in the read-only memory 206 (step E30) and writes the data B4 (obtained based on the data A4) to the EEPROM memory 208 (E50).

In one alternative to the second embodiment, the command CMD4 received in step E10 contains no identifier ID(i). In this case, the microcontroller 202 detects in step E20 the absence of an identifier ID(i) in the received command CMD4 and deduces from it that a pre-issuance and an issuance must be carried out based solely on the prerecorded data A2 and A4 respectively designed for the pre-issuance and the issuance of the card 200. Once the prerecorded data A2 and A4 are identified in the read-only memory 206, the microcontroller 202 proceeds with the pre-issuance and issuance steps.

To accomplish this, after step E30 the microcontroller reads the prerecorded data A2 in the read-only memory 206 (step E30) and writes the data B2 (obtained based on the data A2) to the EEPROM memory 208 (step E50). The microcontroller 202 then reads the prerecorded data A4 in the read-only memory 206 (step E30) and writes the data B4 (obtained based on the data A4) to the EEPROM memory 208 (E50).

Moreover, the implementations of the invention described earlier apply to a microcircuit card. It will however be understood that the invention can apply to other types of electronic entities that include a read-only memory and a nonvolatile rewritable memory. The invention can apply, for example, to a USB flash drive or to an electronic passport.

Likewise, the card reader 400 can correspond to any device that includes means for sending a write command in conformity with the invention to an electronic entity such as the microcircuit card 200, for example. Such a device can correspond, for example, to a computer that includes a USB port capable of communicating with a USB flash drive conforming to the invention.

The present invention is advantageous in that it allows a considerable reduction in the number of write commands to be sent to an electronic entity, such as a microcircuit card, in order to configure it during a configuration step such as a pre-issuance step, an issuance step and/or a post-issuance step.

As a result, the execution time needed for configuring an electronic entity such as a microcircuit card, during pre-issuance, issuance or post-issuance, is significantly reduced. Indeed, the invention makes it possible to dispense, at the level of the card to be configured, with a large number of processing operations inherent in each write command received from the associated card reader. The reduction in the number of commands sent to the card to be configured makes it possible in particular to limit the number of protocol processing, integrity checking, command signature verification and data decryption operations. The invention also makes it possible to substantially limit the number of calls to the "driver" of the nonvolatile rewritable memory (such as the EEPROM 208) during the configuration steps of an electronic entity (such as the card 200).

The invention can thus also make it possible to advantageously reduce the production cost of microcircuit cards.

The invention claimed is:

1. A configuration method implemented by an electronic entity including a first memory section and a second memory section, wherein at least one set of prerecorded data comprising at least one of a preconfigured file and a directory tree is stored in said second memory section, said method comprising: receiving at least one write command for writing to the first memory section; and in response to said at least one write command: selecting, based on said at least one write command, the at least one set of prerecorded data comprising at least one of the preconfigured file and the directory tree stored in said second memory section; obtaining configuration data based on the selected set of prerecorded data comprising at least one of the preconfigured file and the directory tree, said configuration data including pre-issuance data and issuance data comprising personal user data; and writing said configuration data to the first memory section.

2. The method according to claim 1, further comprising:
identifying said prerecorded data comprising at least one of the preconfigured file and the directory tree based on the received at least one write command.

3. The method according to claim 1, wherein the configuration data comprises said prerecorded data comprising at least one of the preconfigured file and the directory tree.

4. The method according to claim 1, wherein the electronic entity performs at least one treatment of the prerecorded data comprising at least one of the preconfigured file and the directory tree to obtain the configuration data.

5. The method according to claim 1, wherein the at least one write command includes at least one identifier of said prerecorded data comprising at least one of the preconfigured file and the directory tree.

6. The method according to claim 5, wherein said at least one identifier identifies a register of the second memory section allowing identification of an area holding said prerecorded data comprising at least one of the preconfigured file and the directory tree.

7. The method according to claim 1, wherein said at least one write command is an Application Protocol Data Unit (APDU) command complying with International Organization for Standardization (ISO) standard 7816.

8. The method according to claim 1, wherein the electronic entity is one of a microcircuit card, a USB flash drive and an electronic passport.

9. The method according to claim 1, wherein a single write command is received during the receiving step.

10. A computer program comprising instructions for executing the configuration method according to claim 1 when said program is executed by a computer.

11. A non-transitory computer-readable recording medium on which is recorded a computer program comprising instructions for execution of the configuration method according to claim 1.

12. An issuance, pre-issuance or post-issuance method implemented by a device including means for communication with an electronic entity, said method comprising sending a command for configuring said electronic entity according to the configuration method of claim 1.

13. A computer program comprising instructions for executing the method according to claim 12 when said program is executed by a computer.

14. A non-transitory computer-readable recording medium on which is recorded a computer program comprising instructions for executing the steps of the method according to claim 12.

15. A device comprising means for sending a write command to an electronic entity, reception of said write command by said electronic entity triggering the configuration method according to claim 1.

16. The method according to claim 1, wherein the first memory section is a non-volatile memory and the second memory section is a read-only memory.

17. The method according to claim 1, wherein the preconfigured file includes one of configuration data for a microcontroller of the electronic entity, configuration data of a communication protocol of the electronic entity and configuration data of the first memory section of the electronic entity.

18. An electronic entity comprising:
a first memory section;
a second memory section;
means for receiving at least one write command for writing to the first memory section; and
processing means for selecting, based on said at least one write command, at least one set of prerecorded data comprising at least one of a preconfigured file and a directory tree stored in the second memory section, obtaining configuration data based on the selected set of prerecorded data comprising at least one of the preconfigured file and the directory tree, said configuration data including pre-issuance data and issuance data comprising personal user data, and writing said configuration data, in response to the at least one write command, to the nonvolatile memory.

19. The electronic entity according to claim 18, wherein the processing means are operable to identify the prerecorded data comprising at least one of the preconfigured file and the directory tree based on the received at least one write command.

20. The electronic entity according to claim 18, wherein the configuration data comprises said prerecorded data comprising at least one of the preconfigured file and the directory tree.

21. The electronic entity according to claim 18, wherein the processing means are operable to extract from the received at least one write command at least one identifier of said prerecorded data comprising at least one of the preconfigured file and the directory tree.

22. The electronic entity according to claim 21, wherein the electronic entity is one of a microcircuit card, a USB flash drive and an electronic passport.

23. The electronic entity according to claim 18, wherein the first memory section is a non-volatile memory and the second memory section is a read-only memory.

* * * * *